June 24, 1941.   W. K. SONNEMANN   2,246,548
PROTECTIVE RELAY
Filed Oct. 22, 1938   2 Sheets-Sheet 1
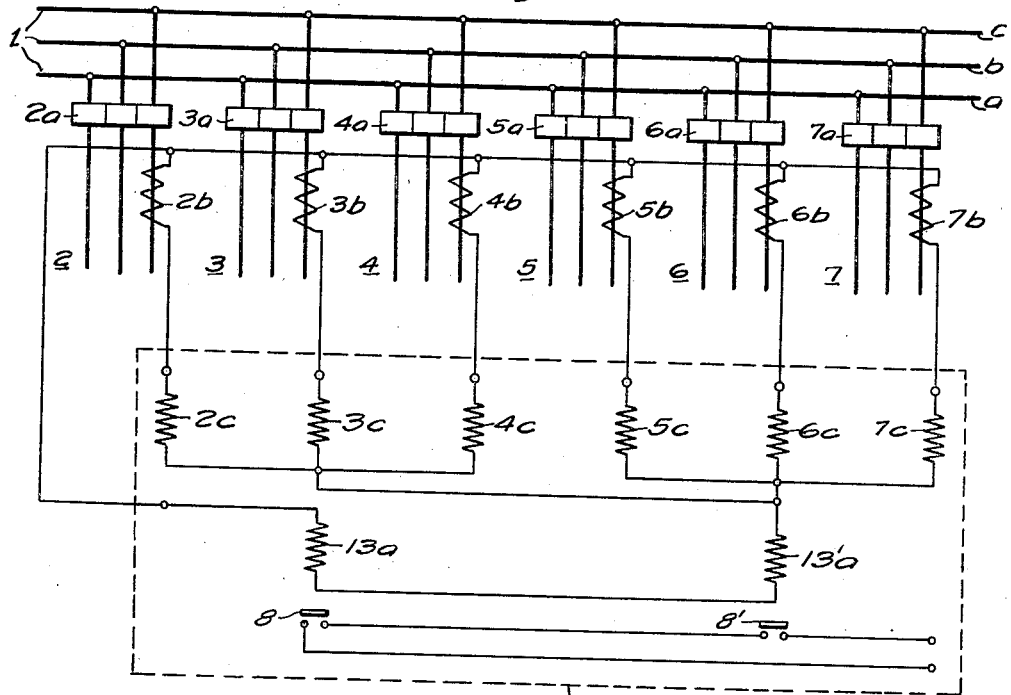
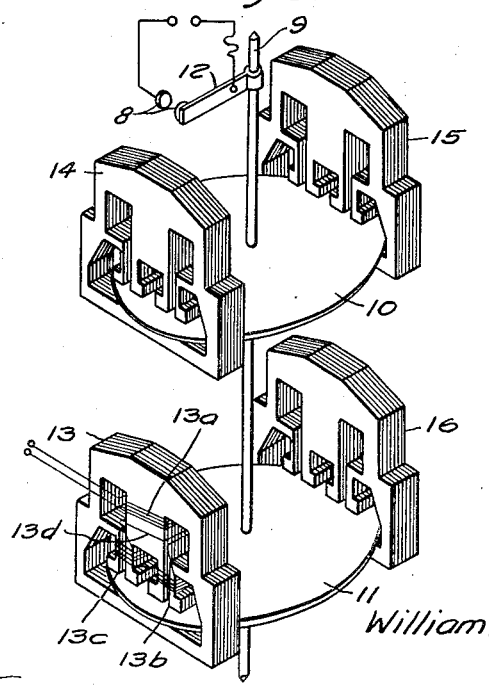
WITNESSES:
E. A. McCloskey
Olin C. Groome
INVENTOR
William K. Sonnemann.
BY
ATTORNEY Patented June 24, 1941

2,246,548

UNITED STATES PATENT OFFICE 2,246,548

PROTECTIVE RELAY

William K. Sonnemann, Newark, N. J., assignor to Westinghouse Electric & Manufacturing Company, East Pittsburgh, Pa., a corporation of Pennsylvania Application October 22, 1938, Serial No. 236,396

24 Claims. (Cl. 175—294)

This invention relates to protective relays, and it has particular relation to ratio or percentage differential relays for protecting electrical systems or apparatus against damage or interruptions caused by internal faults.

Ratio or percentage differential relays have been employed widely heretofore for protecting apparatus and electrical systems against faults occurring between the terminals of the system. These relays operate by balancing the current input to an electrical apparatus or system to the current output therefrom, and if a difference exists, a current proportional to the difference is passed through the operating winding of a differential relay for actuating the relay. Since these relays are not intended to respond to through current, it is customary to provide the relays with restraint windings to prevent actuation of the relays due to dissimilarities or irregularities in the current transformers or other equipment used to energize the relays. When an external fault occurs on such electrical apparatus or systems, heavy through currents flow and these heavy currents accentuate any dissimilarities or irregularities present in the current transformers.

Sensitivity in a ratio-differential relay may be designated by the minimum percentage of through or restraint current which must be passed through the operating coil in order to actuate the relay. The sensitivity of the relay may be said to vary as an inverse function of this percentage. Thus a relay having a percentage of five per cent is more sensitive than one having a percentage of ten per cent.

In order to preclude any possibility of the differential relay operating under these conditions, it is customary to reduce the sensitivity of the ratio-differential relay. Unfortunately such a reduction in sensitivity in the past has been effective over the entire operating range of the ratio-differential relay, so that such installations have not been sufficiently responsive to difference currents resulting from internal faults. This unsatisfactory operation has been particularly noticeable on systems having neutrals grounded through high impedances. In such cases, the currents flowing upon the occurrence of an internal fault to ground are very little larger or less than a full-load current normally passing through the protected system. In order to detect these small fault currents, it is necessary to have a high degree of sensitivity in a ratio-differential relay when the normal load current is furnishing normal restraint in the relay. The prior art relays of reduced sensitivity do not suffice for this purpose.

As pointed out in the copending application of William K. Sonnemann et al., Serial No. 236,397, filed October 22, 1938, and assigned to the Westinghouse Electric & Manufacturing Company, a ratio-differential relay may be designed with a "flared" sensitivity characteristic, the sensitivity varying from high values within the normal load current range of a system to be protected to low values for higher currents. Such a relay may be adjusted to detect small internal fault currents, and yet does not operate under the conditions of unbalance accompanying heavy through currents.

When a ratio-differential relay having a plurality of restraint elements is applied to a multiple terminal system, I have found that it has an appreciable variation in sensitivity according to the number of terminals operatively connected to the system, and according to the distribution of current in the operatively connected terminals. This spread in sensitivity from a maximum to a minimum value is undesirable for the reason that if the proper sensitivity is present for one terminal connection and energization, the relay will be over or under sensitive for other terminal connections and energizations. Moreover, with a ratio-differential relay having a flared characteristic, if the sensitivity characteristic curve for the minimum sensitivity condition of the terminals is satisfactory, the flare on the curve corresponding to the maximum sensitivity condition may be displaced too far from the normal operating range of the relay.

In accordance with this invention, the performance of ratio-differential relays is improved by providing each restraint unit employed for the ratio-differential relay with a plurality of windings. Instead of energizing a single restraint unit from each terminal associated with the system to be protected, I energize windings on several distinct restraint units in accordance with the current carried by a single terminal. Also, instead of carrying current supplied from a single terminal, each restraint unit carries current supplied from a plurality of distinct terminals. In this way I have been able to reduce the range of variation in ratio-differential relays sufficiently to increase the sensitivity of the relay over the normal operating range, so that the relay will be extremely responsive to the relatively small internal ground faults on a system having a neutral grounded through a high impedance.

In order to prevent operation of the relay on through currents of large magnitudes, such as those occurring under external fault conditions, I design a ratio-differential relay to have a sensitivity which decreases with increase in the total through current flowing through the system to be protected.

It is, therefore, an object of my invention to provide a ratio-differential relay having a diminished variation in sensitivity over the normal operating range thereof.

It is another object of my invention to provide a ratio-differential relay having a sensitivity which decreases with increase in current flowing through a protected circuit, and having a small spread between maximum and minimum sensitivities for any current value.

It is another object of my invention to energize a restraint unit for a ratio-differential relay from a plurality of sources.

It is a further object of my invention to energize a plurality of restraint units of a ratio-differential relay in accordance with the current flowing through a single terminal.

It is a still further object of my invention to provide a ratio-differential relay having two or more energizing windings on one or more restraint units.

Other objects of my invention will be apparent from the following description taken in conjunction with the accompanying drawings, in which:

Figure 1 is a diagrammatic view of a differential relay employing relay units similar to those available in the prior art;

Fig. 2 is a view in perspective of a ratio-differential relay;

Figure 3:
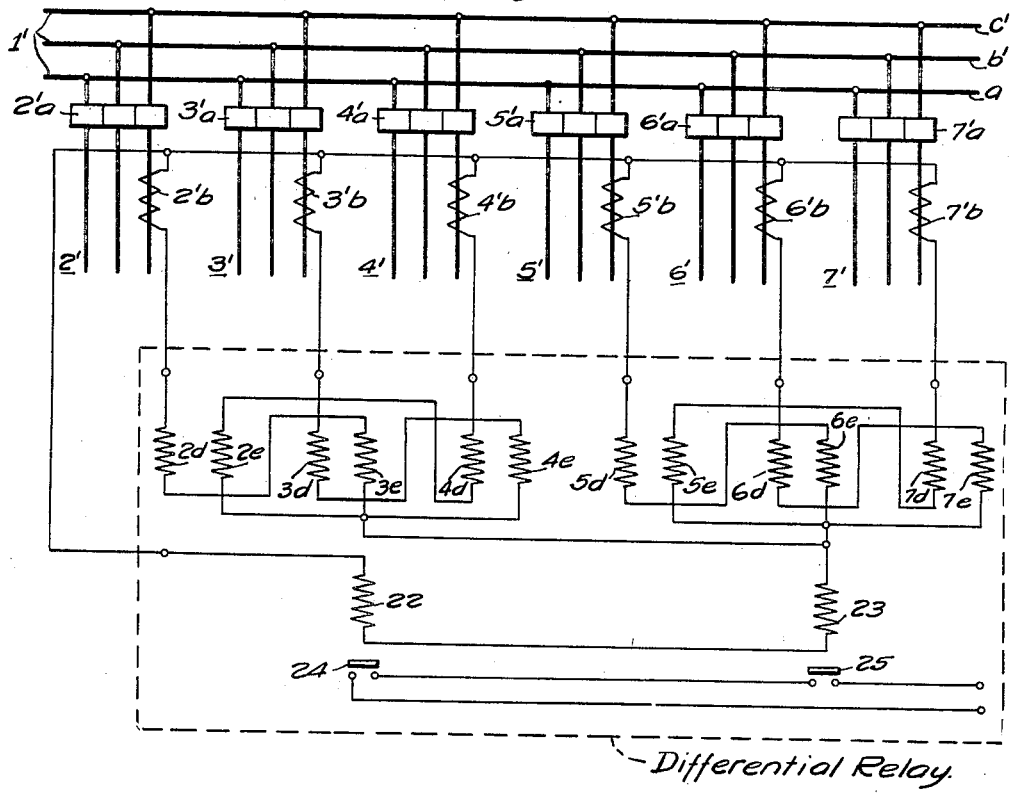
Fig. 3 is a diagrammatic view of an electrical system protected by a ratio-differential relay conforming to my invention.

Referring to Fig. 1, I have illustrated an electrical system or apparatus to be protected having a plurality of terminals. In a specific embodiment, the system comprises a bus 1 having a plurality of terminals 2, 3, 4, 5, 6, and 7 connected thereto through circuit breakers 2a, 3a, 4a, 5a, 6a, and 7a. By terminals I refer either to single-phase or polyphase terminals. Although Fig. 1 shows a three-phase system having phases a, b and c, for the sake of simplicity, I have illustrated protection for phase c alone.

In order to energize a ratio-differential relay, I provide phase c of each terminal with a current transformer 2b, 3b, 4b, 5b, 6b, and 7b, each of which is connected to a restraint winding 2c, 3c, 4c, 5c, 6c, and 7c of a ratio-differential relay. This ratio-differential relay may include two units of the type illustrated in Fig. 2, wherein a movable armature system is employed for actuating a pair of contacts 8. The armature assembly comprises a rotatable shaft 9 carrying two electroconductive discs 10 and 11. Upon the shaft 9 an arm 12 is mounted for actuating the contacts 8. Rotation of the armature assembly is governed by four electromagnets 13, 14, 15 and 16, which carry windings for applying a torque to the discs 10 and 11 by means of induction action. Each electromagnet carries an energizing winding 13a and a plurality of auxiliary windings 13b and 13c. The auxiliary windings are connected to a winding 13d which is energized from the winding 13a by transformer action. As shown clearly in Fig. 2, the windings 13a and 13d are mounted on a central pole of the electromagnet 13, whereas the auxiliary windings are mounted on auxiliary poles formed on the electromagnet. The various windings are arranged to rotate the armature assembly in contact closing direction. The electromagnets 14, 15 and 16 carry windings similar to those illustrated for electromagnet 13, but the windings on these remaining electromagnets are arranged to rotate the armature assembly in contact opening direction. A spring (not shown) may be provided for biasing the contacts 8 in their open position.

As shown in Fig. 1, the restraint windings 2c, 3c and 4c correspond to the energizing windings for the electromagnets 14, 15 and 16, the operating winding 13a being shown below these restraint windings. Similarly, the restraint windings 5c, 6c and 7c correspond to energizing windings for a similar ratio-differential relay unit having an operating winding 13'a corresponding to the operating winding 13a of Fig. 2. It will be noted in Fig. 1 that each current transformer and its associated restraint winding forms one branch of a 6-branch parallel circuit. Across this parallel circuit, the operating windings 13 and 13'a are connected in series. Each relay unit is provided with a separate contact-making means as illustrated, and these contact-making means 8 and 8' are connected in series for controlling any desired apparatus, such as the circuit breakers 2a, 3a, 4a, 5a, 6a, and 7a or operation indicators.

Since the contact-making means 8 and 8' are connected in series, it is clear that to operate any mechanism connected thereto, both of the contact-making means must be in closed positions. Assuming all or part of the terminals operatively connected to the bus 1, when through current flows one or more of the restraint windings of the differential relay will be energized, thus preventing operation of any control element connected to the trip circuit of the relay. If the current transformers 2b, 3b, 4b, 5b, 6b, and 7b are exactly similar and do not exhibit saturation, or other errors, under normal operation of the electrical system disclosed, or under external fault conditions, no current will flow in the operating windings 13a and 13'a. Upon the occurrence of an internal fault, however, such as a fault from phase c of the bus to ground, a difference current representing the difference between current entering and leaving the bus through the terminals will flow through the operating windings 13a and 13'a, to close the contact-making means 8 and 8'. This system is similar to that disclosed in the application of Roy M. Smith, Serial No. 236,393, filed October 22, 1938, and assigned to the Westinghouse Electric & Manufacturing Company. Further details may be found by reference to this application.

From a practical standpoint, the adjustment of the system depicted in Fig. 1 is limited because of dissimilarities occurring in the various transformers and because of irregularities caused by the saturation of one or more of the current transformers under some conditions in which no internal faults are present. Because of these dissimilarities and irregularities, it is impossible to adjust such a relay for operation as sensitive as desired for some installations.

By providing a ratio-differential relay having the flared sensitivity characteristic described in the aforesaid application of Sonnemann et al., it is possible to improve the relay operation appreciably. However, to be effective, the decrease in sensitivity, or "flare," should cover about the same range of through current for all possible relay conditions, and the difference between maximum and minimum sensitivities for points within the normal relay operating range should be as small as possible.

One of the causes of the spread in sensitivities for various relay conditions resides in the fact that the torque or restraint offered by a restraint coil varies as the square of the current passing therethrough. For example, assume that a condition occurs in which 60 amperes are divided evenly among the three restraint coils 2b, 3b and 4b. The restraint in each coil would be proportional to the square of its current (20 amperes), and the total restraint in the three coils may be represented by the quantity $3\times(20)^2=1200$. Now assume that the condition of the terminals is such that the full 60 amperes flows through a single restraint coil 2b. In this case, the total restraint may be represented by the quantity $(60)^2=3600$. Therefore, for the same total restraint current, a spread of 3600 to 1200 in restraint is obtained, with a resultant variation in relay sensitivity. Other factors, such as saturation of the restraint coil cores and departure of torque from the square law at high current values, also affect the relay characteristics.

In order to improve the operation of the system disclosed in Fig. 1, I have associated with the apparatus or electrical system to be protected, a ratio-differential relay of improved construction. As shown in Fig. 3, the bus, circuit breakers, terminals, and current transformers all correspond to similar elements shown in Fig. 1, the same reference characters being used primed. The ratio-differential relay, however, is modified by replacing each of the restraint windings shown in Fig. 1 by a double restraint winding. That is, instead of the single restraint winding 2c, in Fig. 3 I have illustrated a double restraint winding 2d, 2e. Instead of the single restraint winding 3c, I have illustrated a double restraint winding 3d, 3e, etc. Each pair of restraint windings 2d and 2e, 3d and 3e, etc., is mounted on a single electromagnet in place of the single restraint winding formerly used.

Figure 4:
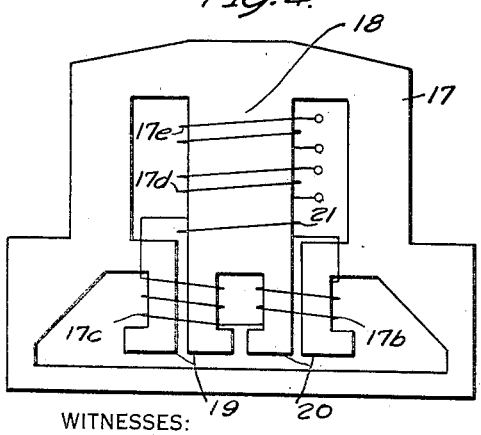
Fig. 4 is a view in front elevation of restraint electromagnet for a ratio-differential relay.

Such an arrangement is shown in Fig. 4, in which an electromagnet 17 is provided with a main pole 18 and auxiliary poles 19 and 20. As in the case of the electromagnets shown in Fig. 2, a pair of auxiliary windings 17b and 17c are mounted about the auxiliary poles and are connected to a winding 21 formed on the main pole 18. The energizing winding, however, is composed of two sections 17e and 17d which are wound around the main pole 18. In a ratio-differential relay designed in accordance with my invention, the restraint electromagnets 14, 15 and 16 of Fig. 2 each carry windings similar to those shown in Fig. 4.

Referring again to Fig. 3, it will be noted that each current transformer is connected to two restraint windings mounted on different restraint units. For example, the current transformer 2'b now is connected to the restraint windings 2d and 3e in series. Similarly, by tracing circuits, it will be found that each of the remaining current transformers is connected to a different pair of restraint units. In the ratio-differential relay shown in Fig. 3, a pair of operating windings 22 and 23 are provided which correspond in function and design to the operating windings 13a and 13'a shown in Figs. 1 and 2, and contact-making means 24 and 25 correspond to the contact-making means 8 and 8' shown in Figs. 1 and 2.

Upon studying Fig. 3, it will be found that when current flows through the electrical system being protected, at least two restraint units always will be energized. By spreading the energization of the restraint units in this way, it has been found that the ratio-differential relay is less subject to variations and that it can be set for a sensitivity appreciably higher than that permissible for the system shown in Fig. 1, without fear of incorrect operation. Since this increased sensitivity is unnecessary and undesirable for current ranges well above the full-load operating current for the system, I prefer to design the ratio-differential relay shown in Fig. 3 to be relatively insensitive for these higher current ranges. This may be accomplished by making the operating windings or operating units for the ratio-differential relay less efficient relative to the restraint windings for currents corresponding to these higher current ranges. For example, the electromagnet 13 of Fig. 2 may be designed to saturate or operate with decreasing permeability in these higher current ranges, as disclosed in the aforesaid application of William K. Sonnemann, et al.

Figure 5:
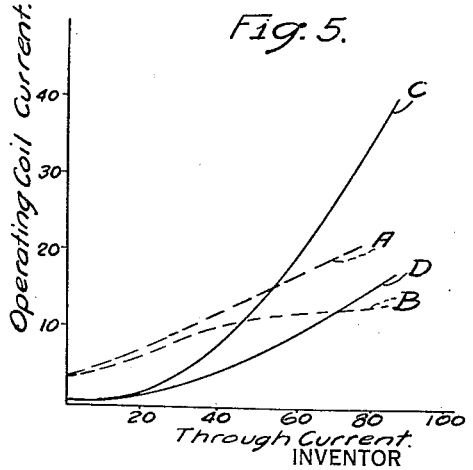
Fig. 5 is a graph showing operating characteristics of ratio-differential relays.

The operating characteristics for relays designed in accordance with the prior art and in accordance with my invention, are illustrated in Fig. 5, in which curves are plotted to show the relation between operating coil current and the through current flowing through the terminals into and out of the bus. As shown by curves A and B, which represent typical characteristics for prior art relays, the ratio of operating coil current to total current remains substantially constant, or even falls, as the total current increases. This means that the sensitivity of the relay remains constant or increases as the total current increases. On the other hand, I prefer to design a ratio-differential relay corresponding to that illustrated in Fig. 3, to have characteristics similar to those shown by the curves C and D which represent minimum and maximum conditions. As will be noted from these curves, the ratio of operating coil current to total current increases for the higher current ranges. That is, within the normal operating range for the electrical system to be protected, the ratio-differential relay has a high degree of sensitivity but as the total current increases, the sensitivity falls, thereby preventing incorrect operation of the ratio-differential relay over the higher current ranges. It will be observed that the sensitivity curves C, D have a very small spread. Consequently the sensitivities over the low or normal current range may be unusually high.

It may be desirable to point out that the various terminals illustrated and referred to as connected to the buses 1 and 1' may have varied functions, as desired. For example, certain of them may be bus ties, feeders, or sources of energy, as desired. Various arrangements are possible and all of the arrangments will be protected by the ratio-differential relay illustrated and described.

Although I have described my invention with reference to certain specific circuits, apparatus and parts, it is obvious that numerous modifications thereof are possible. For example, instead of a six restraint coil unit, my invention may be applied to a ratio-differential relay having three restraint windings, or other combinations of windings. Therefore, I do not wish my invention to be restricted except as required by the appended claims when interpreted in view of the prior art.

I claim as my invention:

1. In a relay, a plurality of restraint units, a plurality of energizing windings for each of said restraint units, a common operating unit for said restraint units, and control means responsive to the combined condition of said operating and restraint units.

2. In a differential relay, a first restraint unit comprising a plurality of first energizing windings, a second restraint unit comprising a plurality of second energizing windings, one of said first energizing windings and one of said second energizing windings being electrically connected for energization from a common source, a common operating unit for said restraint units, and control means responsive to the combined condition of said operating and restraint units.

3. In a relay system, a plurality of restraint units, a plurality of energizing sources for said restraint units, each of said energizing sources being connected to energize a different pair of said restraint units, a common operating unit for said restraint units, and control means responsive to the combined condition of said operating and restraint units.

4. In a differential relay system, a plurality of restraint units, a plurality of energizing sources for said restraint units, each of said restraint units being connected to be energized from a different pair of said energizing sources, a common operating unit for said restraint units, and control means responsive to the combined condition of said operating and restraint units.

5. In a differential relay system, three restraint units, two windings for each of said restraint units, three energizing sources, each of said sources being connected for energizing a different pair of said energizing windings, each of said pairs including windings on a different pair of said restraint units, and a common operating unit for said restraint units.

6. In a differential relay system, a plurality of restraint units, a plurality of energizing sources for said restraint units, each of said restraint units being connected to be energized from a different pair of said energizing sources, a common operating unit for said restraint units, and control means responsive to the combined condition of said operating and restraint units, the sensitivity of said relay system decreasing as the energization of said restraint units increases.

7. In a protective arrangement for an electrical system having a plurality of terminals through which currents normally enter and leave said system, a plurality of groups of restraint means, each of said groups of restraint means being connected for energization in accordance with the current flowing through one of said terminals, operating means connected for energization in accordance with current leaving said system by a path other than said terminals, and control means responsive to the combined conditions of said restraint and operating means.

8. In a protective arrangement for an electrical system having a plurality of terminals through which currents normally enter and leave said system, a plurality of groups of restraint means, each of said groups of restraint means being connected for energization in accordance with the current flowing through a separate one of said terminals, operating means connected for energization in accordance with current leaving said system by a path other than said terminals, and control means responsive to the combined conditions of said restraint and operating means, said means being so proportioned that the ratio of energization of said operating means to the energization of restraint means necessary to effect an operation of said control means increases with an increase in energization of said restraint means.

9. In a protective arrangement for an electrical system having a plurality of terminals through which currents normally enter and leave said system, a plurality of groups of restraint means, each of said groups of restraint means being connected for energization in accordance with the current flowing through one of said terminals and each of said restraint means being connected for energization in accordance with currents flowing in a distinct group of said terminals, operating means connected for energization in accordance with current leaving said system by a path other than said terminals, and control means responsive to the combined conditions of said restraint and operating means.

10. In a protective arrangement for an electrical system having a plurality of terminals through which currents normally enter and leave said systems, a plurality of groups of restraint means, each of said groups of restraint means being connected for energization in accordance with the current flowing through one of said terminals and each of said restraint means being connected for energization in accordance with currents flowing in a distinct group of said terminals, operating means connected for energization in accordance with current leaving said system by a path other than said terminals, and control means responsive to the combined conditions of said restraint and operating means, said means being so proportioned that the ratio of energization of said operating means to the energization of restraint means necessary to effect an operation of said control means increases with an increase in energization of said restraint means.

11. In a protective arrangement for a system having a plurality of terminals through which currents enter and leave said system, a plurality of relay units each comprising control means and restraint means and operating means for actuating said control means, each of said restraint means being connected for energization in accordance with currents flowing through a distinct group of said terminals, means for energizing said operating means in accordance with a current flowing to a fault occurring in said system, and controlled means operable by said control means only when all of said control means are actuated to their control positions.

12. In a protective arrangement for a system having a plurality of terminals through which currents enter and leave said system, a plurality of relay units each comprising control means and restraint means and operating means for actuating said control means, each of said restraint means being connected for energization in accordance with currents flowing through a distinct group of said terminals, means for energizing said operating means in accordance with a current flowing to a fault occurring in said system, and controlled means operable by said control means only when all of said control means are actuated to their control positions, said means being so proportioned that the ratio of energization of said operating means to the energization of restraint means necessary to effect an operation of said control means increases with an increase in energization of said restraint means.

13. In a protective arrangement for an electrical system having a plurality of terminals through which currents normally enter and leave said system, a current transformer for each of said terminals for providing a source of current dependent on the current flowing through the terminal associated therewith, a plurality of groups of restraint means, each of said groups of restraint means being connected for energization in accordance with the secondary current flowing in one of said current transformers, operating means connected for energization in accordance with a current flowing to a fault occurring in said system, and control means responsive to the combined conditions of said restraint and operating means.

14. In a protective arrangement for an electrical system having a plurality of terminals through which currents normally enter and leave said system, a current transformer for each of said terminals for providing a source of current dependent on the current flowing through the terminal associated therewith, a plurality of groups of rstraint means, each of said groups of restraint means being connected for energization in accordance with the secondary current flowing in a separate one of said current transformers, operating means connected for energization in accordance with a current flowing to a fault occurring in said system, and control means responsive to the combined conditions of said restraint and operating means, said means being so proportioned that the ratio of energization of said operating means to the energization of restraint means necessary to effect an operation of said control means increases with an increase in energization of said restraint means.

15. In a protective arrangement for an electrical system having a plurality of terminals through which currents normally enter and leave said system, a current transformer for each of said terminals for providing a source of current dependent on the current flowing through the terminal associated therewith, a plurality of groups of restraint means, each of said groups of restraint means being connected for energization in accordance with the secondary current flowing in one of said current transformers, and each of said restraint means being connected for energization in accordance with currents flowing in the secondary windings of a distinct group of said current transformers, operating means connected for energization in accordance with a current flowing to a fault occurring in said system, and control means responsive to the combined conditions of said restraint and operating means.

16. In a protective arrangement for an electrical system having a plurality of terminals through which currents normally enter and leave said system, a current transformer for each of said terminals for providing a source of current dependent on the current flowing through the terminal associated therewith, a plurality of groups of restraint means, each of said groups of restraint means being connected for energization in accordance with the secondary current flowing in one of said current transformers, and each of said restraint means being connected for energization in accordance with currents flowing in the secondary windings of a distinct group of said current transformers, operating means connected for energization in accordance with a current flowing to a fault occurring in said system, and control means responsive to the combined conditions of said restraint and operating means, said means being so proportioned that the ratio of energization of said operating means to the energization of restraint means necessary to effect an operation of said control means increases with an increase in energization of said restraint means.

17. In a protective arrangement for an electrical system having a plurality of terminals through which currents normally enter and leave said system, a current transformer for each of said terminals for providing a source of current dependent on the current flowing through the terminal associated therewith, a plurality of differential relay units each comprising control means, restraint units each having a plurality of restraint windings and an operating winding for actuating said control means, means for connecting restraint windings on different restraint units for energization from the secondary of one of said current transformers, means for energizing each of said operating windings in accordance with current flowing to a fault occurring in said system, and controlled means operable to a predetermined condition by said control means only when all of said control means are in their control conditions.

18. In a protective arrangement for an electrical system having a plurality of terminals through which currents normally enter and leave said system, a current transformer for each of said terminals for providing a source of current dependent on the current flowing through the terminal associated therewith, a plurality of differential relay units each comprising contact means, a plurality of restraint windings and an operating winding for controlling said contact means, means for connecting a separate group of restraint windings for energization from each of said current transformers, means for energizing each of said operating windings in accordance with current flowing to a fault occurring in said system, said contact means being connected in series for effecting a control operation, and said relay units being so constructed that the ratio of energization of said operating windings to the energization of said restraint windings necessary to effect an operation of said contact means increases with an increase in energization of said restraint windings.

19. In a protective arrangement for an alternating current electrical system having a plurality of terminals through which currents normally enter and leave said system, a current transformer for each of said terminals for providing a source of current dependent on the current flowing through the terminal associated therewith, and a plurality of differential relay units each having a plurality of pairs of restraint windings, each of said pairs of restraint windings being energized from a separate one of said current transformers, having an operating winding connected for energization in accordance with current flowing to a fault occurring in said system, and having contact means controlled by said restraint and operating windings, the contact means of said relay units being connected in series, and said relay units being so proportioned that the ratio of energization for said operating windings to the energization for said restraint windings necessary for actuating said contact means increases with increase in the energization of said restraint windings.

20. In a protective arrangement for an electrical system having a plurality of terminals through which currents normally enter and leave said system; a differential relay unit comprising an electro-conductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting each winding of one of said electromagnets for energization in accordance with current passing through a separate one of said terminals; and means connecting said operating means for energization in accordance with a function of the difference between currents entering and leaving said system through said terminals.

21. In a protective arrangement for an electrical system having a plurality of terminals through which currents normally enter and leave said system; a plurality of differential relay units each comprising an electro-conductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting each winding of one of said electromagnets for energization in accordance with current passing through a separate one of said terminals; means connecting said operating means for energization in accordance with a function of the difference between currents entering and leaving said system through said terminals, and means effective for initiating a control operation only when each of said armature assemblies is in a predetermined position.

22. In a protective arrangement for an electrical system having a plurality of terminals through which currents normally enter and leave said system and having a current transformer associated with each of said terminals for providing a source of current dependent on the current flowing through the associated terminal; a plurality of differential relay units each comprising an electroconductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting each winding of one of said electromagnets for energization in accordance with current passing through a separate one of said current transformers; means connecting said operating means for energization from said current transformers in accordance with a function of the difference between currents entering and leaving said system through said terminals, and means effective for initiating a control operation only when each of said armature assemblies is in a predetermined position.

23. In a protective arrangement for an electrical system having a plurality of terminals through which currents normally enter and leave said system and having a current transformer associated with each of said terminals for providing a source of current dependent on the current flowing through the associated terminal; a plurality of differential relay units each comprising an electroconductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting each winding of one of said electromagnets for energization in accordance with current passing through a separate one of said current transformers; means connecting said operating means for energization from said current transformers in accordance with a function of the difference between currents entering and leaving said system through said terminals, and means effective for initiating a control operation only when each of said armature assemblies is in a predetermined position; each of said relay units being so proportioned that the ratio of energization of its operating means to energization of its restraint means necessary to actuate its armature assembly to said predetermined position increases with an increase in energization of said restraint means.

24. In a protective arrangement for an electrical system having a plurality of terminals through which currents normally enter and leave said system and having a current transformer associated with each of said terminals for providing a source of current dependent on the current flowing through the associated terminal; a plurality of differential relay units each comprising an electroconductive armature assembly mounted for rotation, electromagnetic operating means inductively associated with said armature assembly, said operating means being effective when energized for urging said armature assembly in a first direction of rotation, and a plurality of restraint means each including an electromagnet inductively associated with said armature assembly and having a plurality of energizing windings, said electromagnet being effective when energized for opposing rotation of said armature assembly in said first direction; means for connecting each winding of one of said electromagnets for energization in accordance with current passing through a separate one of said current transformers, the grouping of current transformers employed for energizing each one of said electromagnets differing from the grouping of current transformers employed for energizing each of the remaining electromagnets, means connecting said operating means for energization from said current transformers in accordance with a function of the difference between currents entering and leaving said system through said terminals, and means effective for initiating a control operation only when each of said armature assemblies is in a predetermined position.

WILLIAM K. SONNEMANN.